(12) United States Patent
Bode et al.

(10) Patent No.: US 11,119,861 B2
(45) Date of Patent: Sep. 14, 2021

(54) CROSS-BACKUP APPLICATION DISKLESS DATA MIGRATION

(71) Applicant: International Business Machines Corporation, Armonk, NY (US)

(72) Inventors: Christopher C. Bode, Cary, NC (US); Marci Devorah Formato, Clintondale, NY (US); Nathan B. Best, Apex, NC (US); Rennad L. D. Murugan, Sugar Land, TX (US)

(73) Assignee: International Business Machines Corporation, Armonk, NY (US)

(*) Notice: Subject to any disclaimer, the term of this patent is extended or adjusted under 35 U.S.C. 154(b) by 215 days.

(21) Appl. No.: 16/535,232

(22) Filed: Aug. 8, 2019

(65) Prior Publication Data

US 2021/0042194 A1 Feb. 11, 2021

(51) Int. Cl.
*G06F 11/14* (2006.01)
*G06F 16/188* (2019.01)
*G06F 16/14* (2019.01)
*G06F 16/11* (2019.01)

(52) U.S. Cl.
CPC ........ *G06F 11/1451* (2013.01); *G06F 16/119* (2019.01); *G06F 16/148* (2019.01); *G06F 16/188* (2019.01); *G06F 2201/815* (2013.01)

(58) Field of Classification Search
CPC ... G06F 11/1451; G06F 16/188; G06F 16/148
See application file for complete search history.

(56) References Cited

U.S. PATENT DOCUMENTS 8,812,446 B2 * 8/2014 Raichstein .......... G06F 11/1458
707/653
9,239,840 B1 * 1/2016 Acharya ............... G06F 16/164

OTHER PUBLICATIONS

Lubeck et al., "Choosing a Data Migration Solution for EMC Symmetrix Arrays," Version 3.0, EMC Corporation, copyright 2013, 184 pages. https://www.emc.com/collateral/software/technical-documentation/h4380-choosing-data-migtn-sol-symmetrix-sol-gde.pdf.
Nowak et al., "Objectivity Data Migration," 13th International Conference for Computing in High-Energy and Nuclear Physics (CHEP 2003), La Jolla, California, Mar. 24-28, 2003, 7 pages. https://www.academia.edu/29889806/Objectivity_Data_Migration.
(Continued)

*Primary Examiner* — Loc Tran
(74) *Attorney, Agent, or Firm* — Yee & Associates, P.C.

(57) ABSTRACT

Cross backup application diskless data migration is provided. Legacy data backups eligible for migration are identified in a legacy backup environment. Application specific information regarding the legacy data backups eligible for migration is received. The application specific information is filtered to indicate only legacy backup data that must be migrated representing a type of migration desired. The application specific information corresponding to the legacy backup data that must be migrated is presented as a virtual filesystem mounted within an operating system such that the application specific information is seen as live local data. A backup of the virtual filesystem mounted within the operating system is performed.

20 Claims, 5 Drawing Sheets

(56) References Cited

OTHER PUBLICATIONS

Ouyang et al., "High Performance Pipelined Process Migration with RDMA," CCGRID '11 Proceedings of the 2011 11th IEEE/ACM International Symposium on Cluster, Cloud and Grid Computing, May 23-26, 2011, pp. 314-323. http://hibd.cse.ohio-state.edu/static/media/publications/abstract/ouyangx-2011-ccgrid.pdf.

Anonymous, "A system and method for incremental migration between devices," An IP.com Prior Art Database Technical Disclosure, IPCOM000222141D, published Sep. 20, 2012, 7 pages.

Anonymous, "Near Online Migration for business critical packaged applications," An IP.com Prior Art Database Technical Disclosure, IPCOM000194907D, published Apr. 13, 2010, 7 pages.

Anonymous, "Method and System for Utilizing Free Space of Distributed Devices as a Backup Pool for a Centralized Backup System," An IP.com Prior Art Database Technical Disclosure, IPCOM000237632D, published Jun. 27, 2014, 7 pages.

\* cited by examiner

CROSS-BACKUP APPLICATION DISKLESS DATA MIGRATION

BACKGROUND

1. Field

The disclosure relates generally to data migration and more specifically to cross-backup application diskless data migration.

2. Description of the Related Art

Data migration is the process of selecting, preparing, extracting, and transforming data and permanently transferring the data from one computer storage system to another. Additionally, the validation of migrated data for completeness and the decommissioning of legacy data storage are considered part of the entire data migration process. Data migration is a consideration for any system implementation, upgrade, or consolidation. Typically, data migration is performed in such a way as to be as automated as possible, freeing up human resources from tedious tasks. Data migration occurs for a variety of reasons, including server or storage equipment replacement, maintenance, or upgrade, application migration, website consolidation, disaster recovery, data center relocation, and the like.

SUMMARY

According to one illustrative embodiment, a computer-implemented method for cross-backup application diskless data migration is provided. Legacy data backups eligible for migration are identified in a legacy backup environment. Application specific information regarding the legacy data backups eligible for migration is received. The application specific information is filtered to indicate only legacy backup data that must be migrated representing a type of migration desired. The application specific information corresponding to the legacy backup data that must be migrated is presented as a virtual filesystem mounted within an operating system such that the application specific information is seen as live local data. A backup of the virtual filesystem mounted within the operating system is performed. According to other illustrative embodiments, a computer system and computer program product for cross-backup application diskless data migration are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
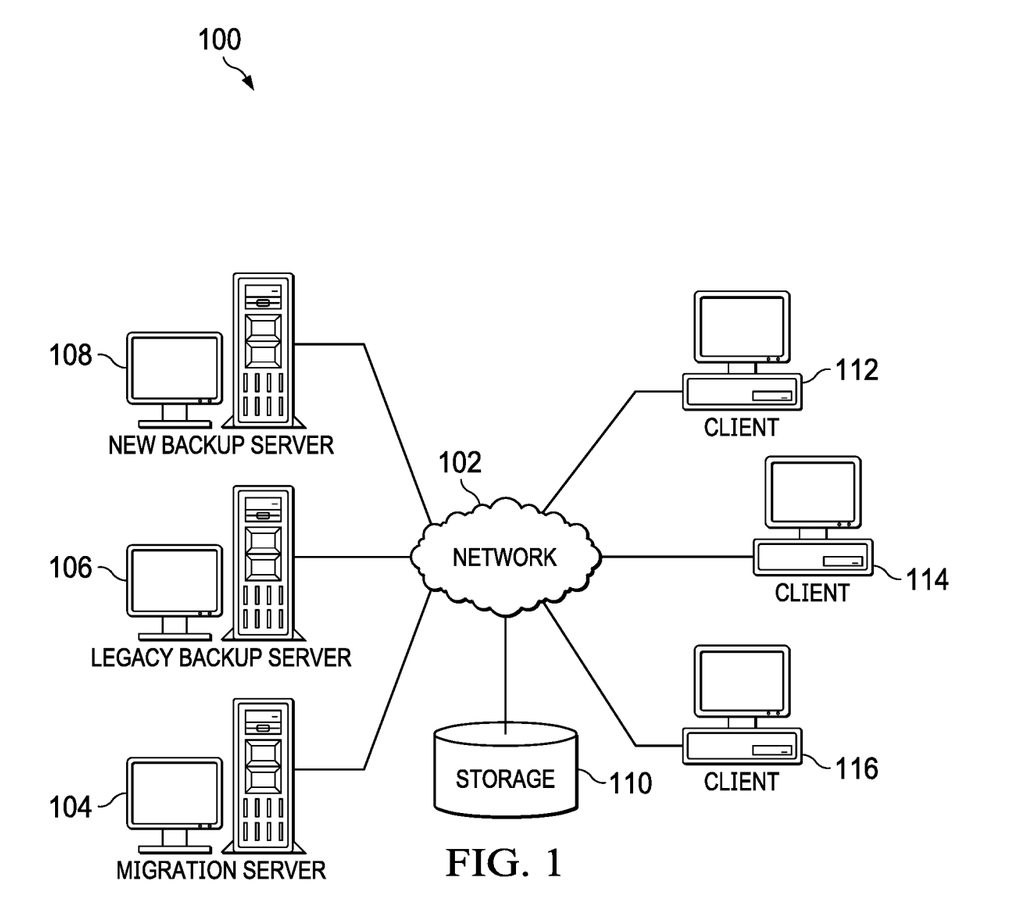
FIG. 1 is a pictorial representation of a network of data processing systems in which illustrative embodiments may be implemented.
Figure 2:
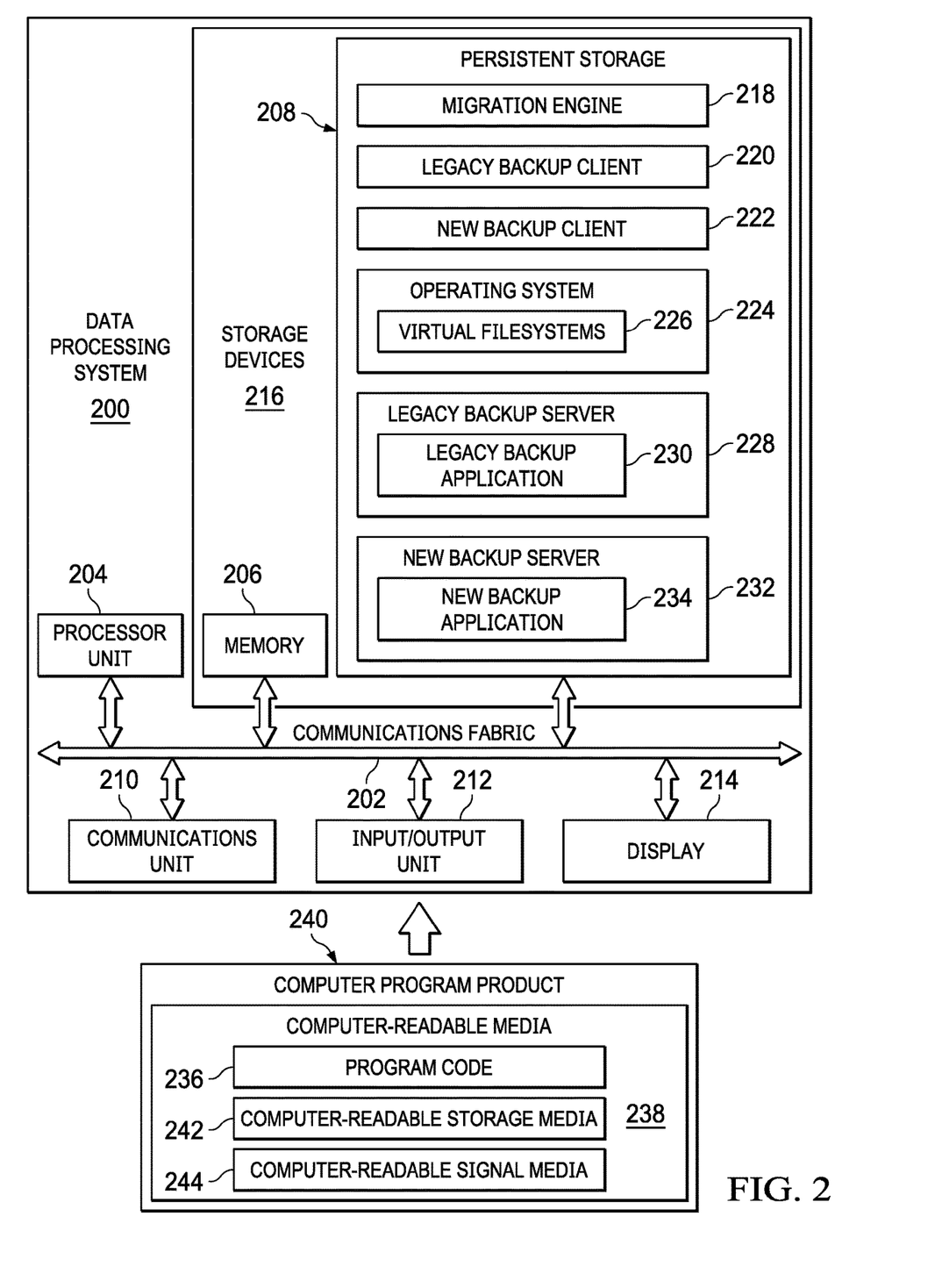
FIG. 2 is a diagram of a data processing system in which illustrative embodiments may be implemented.
Figure 3:
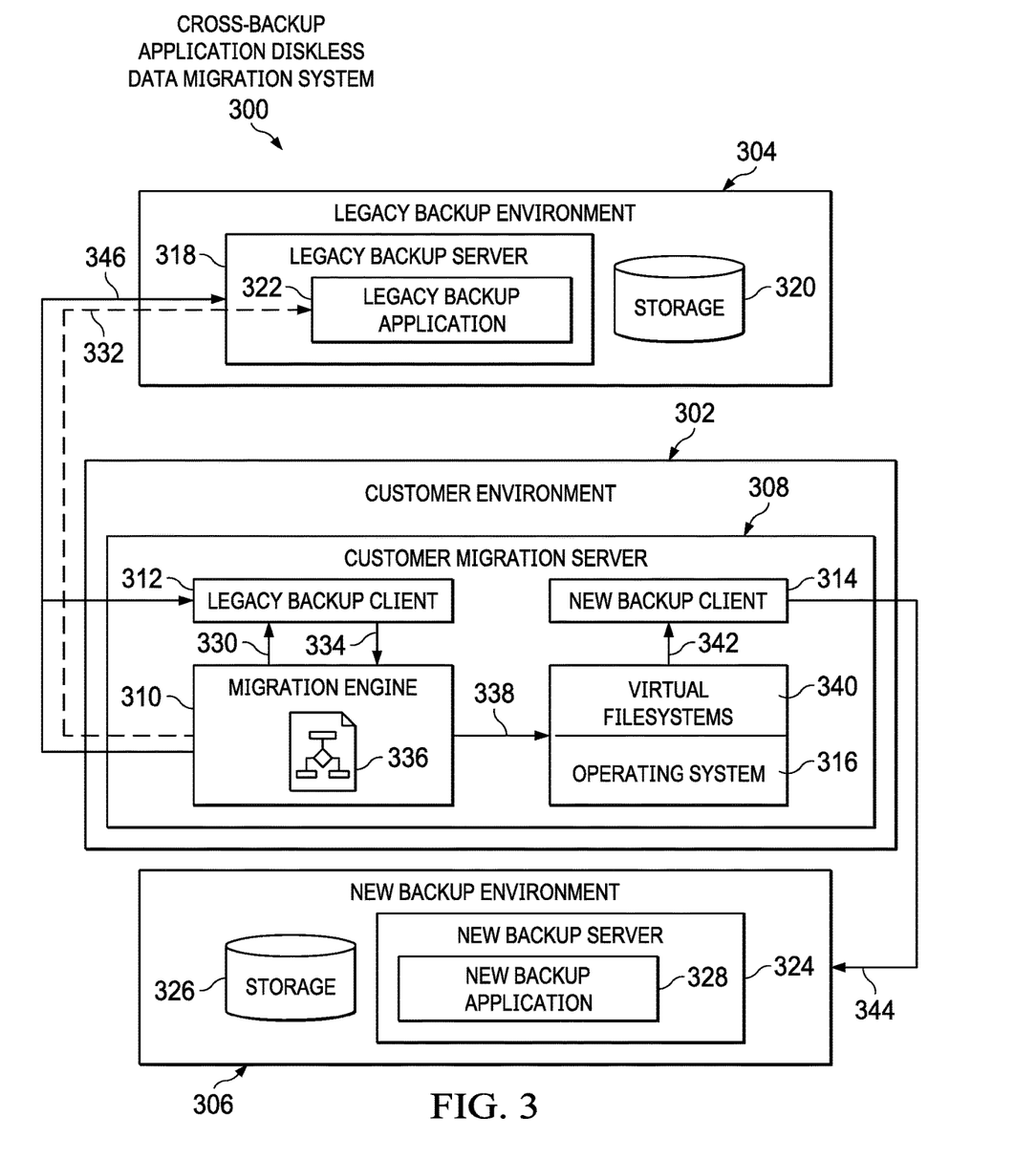
FIG. 3 is a diagram illustrating an example of a cross-backup application diskless data migration system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, migration server 104, legacy backup server 106, and new backup server 108 connect to network 102, along with storage 110. Migration server 104, legacy backup server 106, and new backup server 108 may be, for example, server computers with high-speed connections to network 102. In addition, legacy backup server 106 and new backup server 108 provide data backup services for one or more entities, such as, for example, enterprises, organizations, agencies, institutions, and the like, which may be regulated by state and/or federal laws regarding the management and security of stored data. Also, legacy backup server 106 and new backup server 108 may each represent a cluster of servers located in different data centers. Alternatively, legacy backup server 106 and new backup server 108 may each represent computing nodes located in different cloud environments.

In this example, legacy backup server 106 is being decommissioned and the data backups stored on legacy backup server 106 are to be migrated to new backup server 108. It should be noted that the backup software of legacy backup server 106 is different from the backup software of new backup server 108 (e.g., different proprietary software developed by different software or service providers). Migration server 104 controls the process of migrating the data backups from legacy backup server 106 to new backup server 108. Migration server 104 utilizes a cross-backup application diskless data migration process to migrate a data backup from legacy backup server 106 to new backup server 108 as a virtual filesystem mounted on an operating system of migration server 104. Thus, processes running on migration server 104 see the virtual file system (i.e., information corresponding to the data backup) as live local data. As a result, migration server 104 does not require an intermediary storage disk or set of storage disks to migrate the data backup. In addition, it should be noted that the operating system of migration server 104 is the same or similar to the operating system of legacy backup server 106. Further, migration server 104 maps the data backup into a common data format.

Client 112, client 114, and client 116 also connect to network 102. Clients 112, 114, and 116 are clients of legacy backup server 106 and new backup server 108. In this example, clients 112, 114, and 116 are shown as desktop or personal computers with communication links to network 102. However, it should be noted that clients 112, 114, and 116 are examples only and may represent other types of data processing systems, such as, for example, network computers, laptop computers, handheld computers, smart phones, smart televisions, and the like. Users of clients 112, 114, and 116 may utilize clients 112, 114, and 116 to submit read requests for data files stored on legacy backup server 106 and new backup server 108.

Storage 110 is a network storage device capable of storing any type of data in a structured format or an unstructured format. In addition, storage 110 may represent a plurality of network storage devices. Further, storage 110 may store identifiers and network addresses for a plurality of backup servers, identifiers and network addresses for a plurality of client devices, identifiers for a plurality of users, a plurality of different data backups, and the like. Furthermore, storage 110 may store other types of data, such as authentication or credential data that may include user names, passwords, and biometric data associated with system administrators and users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on migration server 104 and downloaded to legacy backup server 106 over network 102 for use on legacy backup server 106.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as migration server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores migration engine 218, legacy backup client 220, new backup client 222, and operating system 224. However, it should be noted that even though migration engine 218 is illustrated as residing in persistent storage 208, in an alternative illustrative embodiment migration engine 218 may be a separate component of data processing system 200. For example, migration engine 218 may be a hardware component coupled to communication fabric 202 or a combination of hardware and software components.

Migration engine 218 controls the process of migrating data backups from a legacy backup server in a legacy backup environment to new backup server in a new backup environment utilizing cross-backup application diskless data migration. Migration engine 218 utilizes legacy backup client 220 to query the legacy backup server using application specific commands and application programming interfaces corresponding to the backup software loaded on the legacy backup server to determine data backups eligible for migration to the new backup server and then to retrieve the eligible data backups from the legacy backup server. Legacy backup client 220 passes the retrieved data backups directly to a read process of new backup client 222 without using an intermediary storage disk as a landing zone or staging area. Migration engine 218 utilizes new backup client 222 to write the backup data to the new backup server using application specific commands and application programming interfaces corresponding to the backup software loaded on the new backup server.

Operating system 224 may be any type of operating system capable of creating virtual filesystems 226. In addition, operating system 224 is the same or similar to the operation system on the legacy backup server. Each virtual file system in virtual filesystems 226 represents information (e.g., metadata) corresponding to a different data backup retrieved from the legacy backup server. Migration engine 218 mounts virtual filesystems 226 (i.e., the information corresponding to the different data backups and not the actual data backups) on operating system 224 so that legacy backup client 220 and new backup client 222 can see the information as live local data.

Legacy backup server 228 represents an identifier of the legacy backup server, such as, for example, legacy backup server 106 in FIG. 1, that is being decommissioned and having its stored data backups migrated to a new backup server. Legacy backup application 230 represents an identifier of the type of backup software loaded on legacy backup server 228. New backup server 232 represents an identifier of the new backup server, such as, for example, new backup server 108 in FIG. 1, that is to store the data backups migrated from legacy backup server 228. New backup application 234 represents an identifier of the type of backup software loaded on new backup server 232. It should be noted that legacy backup application 230 and new backup application 234 represent different types of proprietary backup software, which write data to storage in different formats.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 236 is located in a functional form on computer readable media 238 that is selectively removable and may be loaded onto or transferred to data processing system 200 for running by processor unit 204. Program code 236 and computer readable media 238 form computer program product 240. In one example, computer readable media 238 may be computer readable storage media 242 or computer readable signal media 244. Computer readable storage media 242 may include, for example, an optical or magnetic disc that is inserted or placed into a drive or other device that is part of persistent storage 208 for transfer onto a storage device, such as a hard drive, that is part of persistent storage 208. Computer readable storage media 242 also may take the form of a persistent storage, such as a hard drive, a thumb drive, or a flash memory that is connected to data processing system 200. In some instances, computer readable storage media 242 may not be removable from data processing system 200.

Alternatively, program code 236 may be transferred to data processing system 200 using computer readable signal media 244. Computer readable signal media 244 may be, for example, a propagated data signal containing program code 236. For example, computer readable signal media 244 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 236 may be downloaded over a network to persistent storage 208 from another device or data processing system through computer readable signal media 244 for use within data processing system 200. For instance, program code stored in a computer readable storage media in a data processing system may be downloaded over a network from the data processing system to data processing system 200. The data processing system providing program code 236 may be a server computer, a client computer, or some other device capable of storing and transmitting program code 236.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 242 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Most commercial data backup applications on the market today write data to backup storage in proprietary formats, which are only understood by the vendor's or service provider's application software. This makes it very challenging to switch between backup applications or associated service providers. In some cases, customers may elect to leave their legacy backup environments in place "as is" and wait for the data backups to expire (e.g., expiration of the time period required to retain the data backups). However, this approach is not practical for data backups having longer data retention requirements measured in years as is often the case for regulated entities, such as, for example, healthcare providers, financial institutions, education entities, government agencies, and the like. Keeping a legacy backup environment online requires continuing to pay software licensing fees for legacy backup application software, as well as the upkeep and potential physical equipment replacement of a backup environment that is no longer being used. Another approach used by legacy backup application software is to perform a series of restores from the legacy backup environment to a landing zone or staging area (e.g., storage disk or disks) and then to run backups with the new backup environment to move the data into the new backup environment from the landing zone or staging area. This approach requires the use of significant intermediary infrastructure and can be tedious to schedule and manage.

Illustrative embodiments provide a data migration alternative that does not require a staging or landing storage disk to place data backups on and then back up the data again. Instead, illustrative embodiments leverage application programming interfaces and/or native client capabilities of a customer environment to capture information regarding data backups in a legacy backup environment. Illustrative embodiments represent these data backups as virtual filesystems mounted on an operating system that is similar to an operating system of the legacy backup server in the source legacy backup environment. These virtual filesystems can then be backed up by the new backup application software on the new backup environment and as read requests are issued for individual files on the virtual filesystems, the data is retrieved from the legacy backup environment and passed in memory to the new backup application software on the new backup environment for protection. The backup jobs ingesting the data to the new backup environment are configured with a data retention mapped to the remaining retention period of the data in the legacy backup environment. By mounting the data on the client system, any data encryption methodology used to protect the data would be taken into account. For example, client-side encryption processes would be able to decrypt data at the client, while hardware or native server-side encryption processes would decrypt the data prior to presentation of the data to the client.

Illustrative embodiments utilize several hardware and software components, such as a legacy backup environment, a new backup environment, and backup clients, to perform the cross-backup application diskless data migration. The legacy backup environment is the existing backup environment, which comprises one or more legacy backup servers and legacy backup application software, being migrated from and containing existing data backups that must be migrated to the new backup environment. The new backup environment, which comprises one or more new backup servers and new backup application software, is the new backup environment being migrated to and is used going forward to store the customer data backups. The backup clients, which include a legacy backup client and a new backup client located on a migration server in a customer environment, receive legacy data backups from the legacy backup environment and receive or will receive data backups from the new backup environment as well.

Further, illustrative embodiments utilize a new component (i.e., a migration engine) that is located on the migration server in the customer environment. The migration engine interrogates the legacy backup environment to identify what backup data is contained in the legacy backup environment. Once the migration engine determines what backup data is contained in the legacy backup environment, the migration engine maps the backup data into a common format and filters the backup data to represent the type of data migration desired (e.g., migration of one full image of the legacy backup server per month, migration of all available backup data restore points, or the like). Thus, the migration engine generates a mapped and filtered view listing all of the data files available for restore within a given map point. A map point is how the migration engine represents a data backup as a virtual filesystem. Each virtual filesystem represents a different historical data backup. The migration engine mounts the virtual filesystem as read only within an operating system of the migration server. The operating system of the migration server is the same or similar to the operating system of the legacy backup server. When an attempt is made to read a particular data file on the virtual filesystem, the migration engine issues a request to the legacy backup client to perform a restore of that particular data file. However, rather than writing the data file to disk as in a traditional restore process, illustrative embodiments instead directly pass the incoming data file, which corresponds to the restore request, to a reading process of the new backup client consuming no disk storage at all and only a small amount of memory to buffer performance.

In order to ensure that the retention of data backups in the new backup environment are set properly, the migration engine also interfaces with the new backup application software on the new backup environment to initiate the data backup jobs so that retention is dynamically set per map point (i.e., virtual filesystem) to align with the remaining retention period of the data backups in the legacy backup environment unless a user requests an alternate retention time period to be used instead.

In some cases, using the legacy backup client may not be possible or practical. Example cases may include: when a legacy backup environment has been decommissioned, but data backups of the decommissioned legacy backup environment are still retained; when the customer is unwilling to place a migration engine on each migration server; and the like. To handle such cases, illustrative embodiments can use a single client install with the legacy backup client being reconfigured after each iteration to represent a different production system. Whether or not this reconfiguration is automated is dependent on the processes of the legacy backup application software on the legacy backup environment.

As a result, illustrative embodiments require zero reconfiguration or special integration in the existing customer environment. Illustrative embodiments by representing legacy backup data as a virtual filesystem on the customer migration server, illustrative embodiments avoid having to consider destination data formats of the new backup environment. Illustrative embodiments migrate data backups from the legacy backup server to the new backup server, which requires a conversion of the data backups from the format of the legacy backup application software to a different format used by the new backup application software, by mapping the data backups into a common data format on the customer migration server.

Thus, illustrative embodiments provide one or more technical solutions that overcome a technical problem with migrating data backups from a legacy backup environment to a new backup environment having different backup application software without utilizing an intermediary storage disk as a landing zone or staging area. As a result, these one or more technical solutions provide a technical effect and practical application in the field of data migration.

With reference now to FIG. 3, a diagram illustrating an example of a cross-backup application diskless data migration system is depicted in accordance with an illustrative embodiment. Cross-backup application diskless data migration system 300 may be implemented in a network of data processing systems, such as network data processing system 100 in FIG. 1. Cross-backup application diskless data migration system 300 is a system of hardware and software components for migrating data backups from a legacy backup environment to a new backup environment having different backup application software without utilizing an intermediary storage disk as a landing zone or staging area.

In this example, cross-backup application diskless data migration system 300 includes customer environment 302, legacy backup environment 304, and new backup environment 306. Customer environment 302 includes customer migration server 308. However, it should be noted that customer environment 302 may include more migration servers than shown. Customer migration server 308 may be, for example, migration server 104 in FIG. 1. Customer migration server 308 includes migration engine 310, legacy backup client 312, new backup client 314, and operating system 316. Legacy backup environment 304 includes legacy backup server 318 and storage 320. However, it should be noted that legacy backup environment 304 may include more backup servers and storage than shown. Legacy backup server 318 may be, for example, legacy backup server 106 in FIG. 1. Legacy backup server 318 includes legacy backup application 322. New backup environment 306 includes new backup server 324 and storage 326. However, it should be noted that new backup environment 306 may include more backup servers and storage than shown. New backup server 324 may be, for example, new backup server 108 in FIG. 1. New backup server 324 includes new backup application 328. It should be noted that new backup application 328 is different proprietary software from legacy backup application 322 and writes data to storage 326 in a different data format.

At 330, customer migration server 308, using migration engine 310, queries legacy backup client 312 to identify legacy data backups eligible for migration from legacy backup server 319 to new backup server 324. Migration engine 310 queries legacy backup client 312 using application specific commands and application programming interfaces corresponding to legacy backup application 322. In addition, at 332, migration engine 310, if necessary, directly queries legacy backup server 318 to determine a data backup retention period for the legacy backups eligible for migration.

At 334, legacy backup client 312 responds with application specific information regarding the legacy data backups eligible for migration. In other words, legacy backup client 312 is building a backup data inventory that exists in legacy backup server 318. At 336, migration engine 310 maps the legacy data backups eligible for migration into a common data format. In addition, migration engine 310 filters the legacy data backups to indicate only legacy backup data that must be migrated representing a desired type of migration to be performed. Migration engine 310 may filter the legacy data backups based on, for example, business rules, regulatory rules, or the like. For example, the filter may be only migrate one full image of legacy backup server 318 once per historical month.

At 338, migration engine 310 presents the legacy backup data that must be migrated as virtual filesystem 340. Migration engine 310 mounts virtual filesystem 340 within operating system 316 so that new backup client 314 sees virtual filesystem 340 as live local data. It should be noted that operating system 316 is a type of operating system that allows for creation of virtual filesystems. Further, migration engine 310 populates virtual filesystem 340 with information or metadata (e.g., a full directory or file structure) regarding the legacy backup data that must be migrated. In other words, the actual legacy backup data does not reside in virtual filesystem 340.

At 342, new backup client 314 performs a backup of virtual filesystem 340. Upon receiving a read request for a particular data file on virtual filesystem 340, new backup client 314 pulls the information corresponding to that particular data file from virtual filesystem 340. New backup client 314 provides the information pulled from virtual filesystem 340 corresponding to that particular data file to be read to legacy backup client 312. Legacy backup client 312 retrieves that particular data file from legacy backup server 318 based on the information pulled from virtual filesystem 340. Legacy backup client 312 passes that particular data file retrieved from legacy backup server 318 directly to a read process of new backup client 314 without using a storage disk.

At 344, new backup client 314 writes that particular data file retrieved from legacy backup server 318 to new backup server 324. Furthermore, new backup client 314 sets a retention period for that particular data file in new backup server 324 equal to a remaining retention period of that particular data file in legacy backup server 318. Moreover, at 346, if a need exists to migrate backup data for legacy backup servers that no longer exist or if a customer wishes to run the migration engine on a single customer server, then migration engine 310 reconfigures legacy backup client 312 to repeat the process for each set of original backup data on each legacy backup server or decommissioned backup server.

Figure 4A:
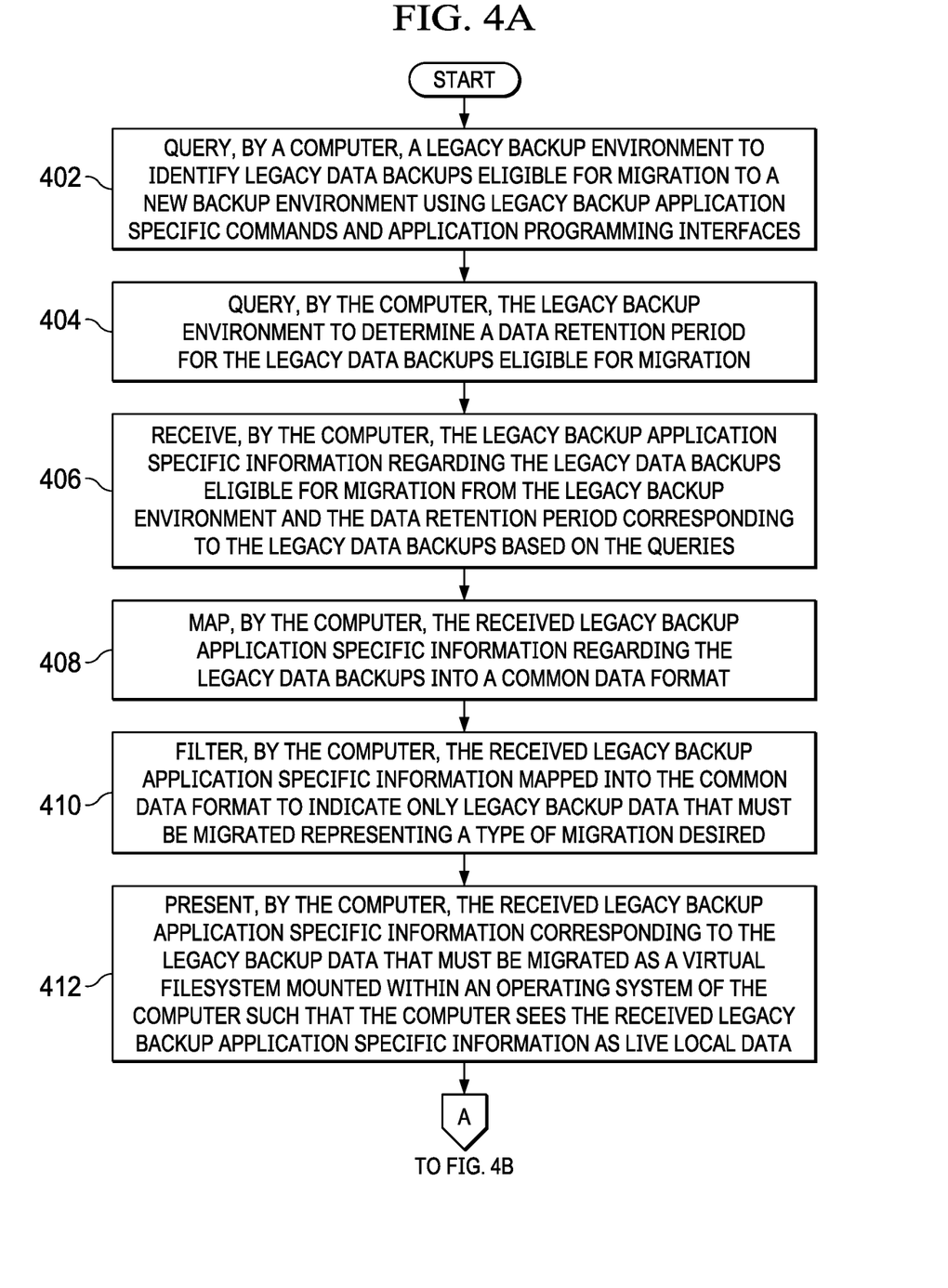
FIGS. 4A-4B are a flowchart illustrating a process for cross-backup application diskless data migration in accordance with an illustrative embodiment.
Figure 4B:
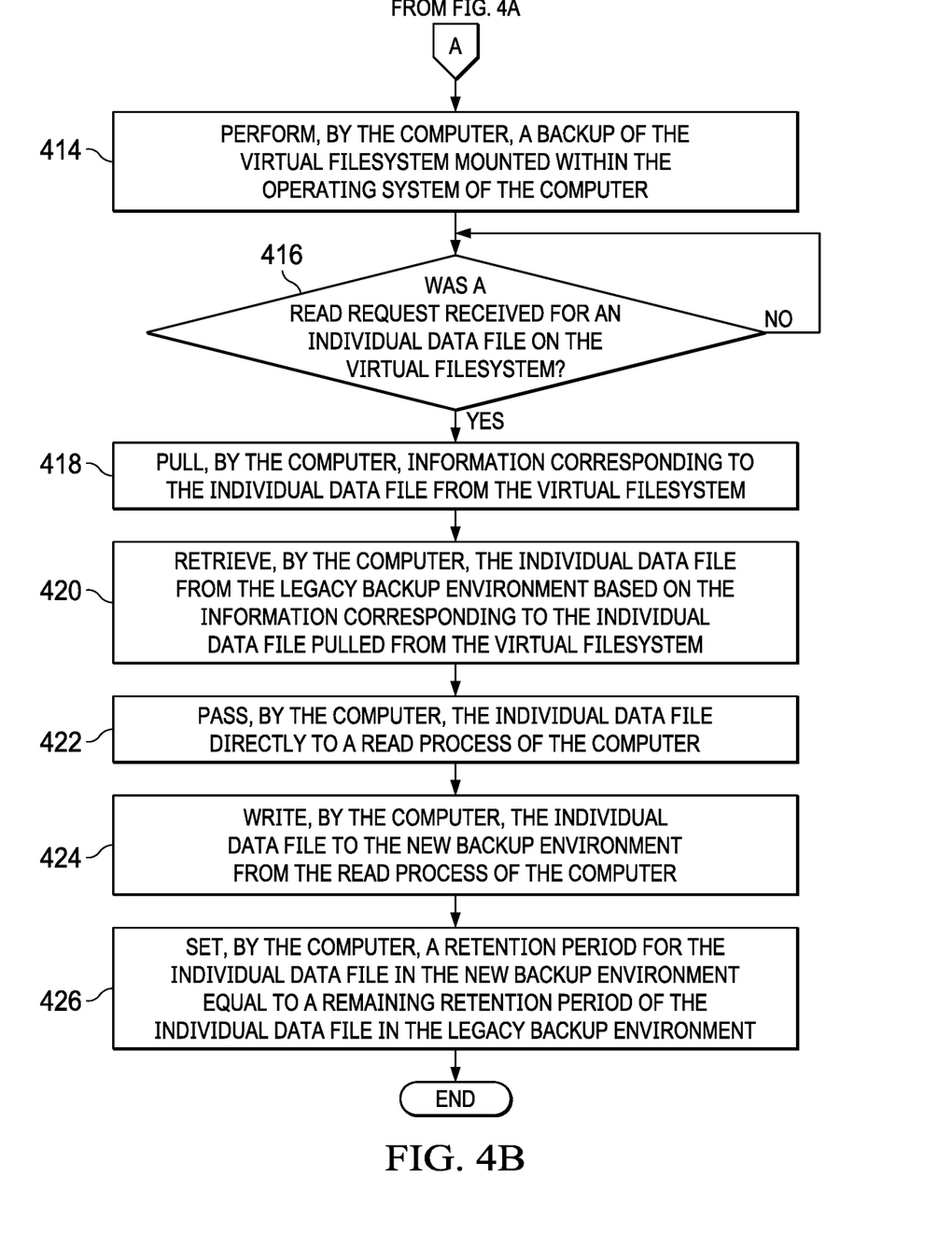

With reference now to FIGS. 4A-4B, a flowchart illustrating a process for cross-backup application diskless data migration is shown in accordance with an illustrative embodiment. The process shown in FIGS. 4A-4B may be implemented in a computer, such as, for example, server 104 in FIG. 1, data processing system 200 in FIG. 2, or customer migration server 308 in FIG. 3.

The process begins when the computer queries a legacy backup environment to identify legacy data backups eligible for migration to a new backup environment using legacy backup application specific commands and application programming interfaces (step 402). In addition, the computer queries the legacy backup environment to determine a data retention period for the legacy data backups eligible for migration (step 404). Afterward, the computer receives legacy backup application specific information regarding the legacy data backups eligible for migration from the legacy backup environment and the data retention period corresponding to the legacy data backups based on the queries (step 406).

The computer maps the received legacy backup application specific information regarding the legacy data backups into a common data format (step 408). Further, the computer filters the received legacy backup application specific information mapped into the common data format to indicate only legacy backup data that must be migrated representing a type of migration desired (step 410). The computer presents the received legacy backup application specific information corresponding to the legacy backup data that must be migrated as a virtual filesystem mounted within an operating system of the computer such that the computer sees the received legacy backup application specific information as live local data (step 412). Furthermore, the computer performs a backup of the virtual filesystem mounted within the operating system of the computer (step 414).

The computer makes a determination as to whether a read request was received for an individual data file on the virtual filesystem (step 416). If the computer determines that a read request was not received for an individual data file on the virtual filesystem, no output of step 416, then the process returns to step 416 where the computer waits for a read request. If the computer determines that a read request was received for an individual data file on the virtual filesystem, yes output of step 416, then the computer pulls information corresponding to the individual data file from the virtual filesystem (step 418).

Afterward, the computer retrieves the individual data file from the legacy backup environment based on the information corresponding to the individual data file pulled from the virtual filesystem (step 420). The computer passes the individual data file directly to a read process of the computer (step 422). Then, the computer writes the individual data file to the new backup environment from the read process of the computer (step 424). The computer also sets a retention period for the individual data file in the new backup environment equal to a remaining retention period of the individual data file in the legacy backup environment (step 426). Thereafter, the process terminates.

Thus, illustrative embodiments of the present invention provide a computer-implemented method, computer system, and computer program product for cross-backup application diskless data migration. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying legacy data backups eligible for migration in a legacy backup environment, wherein the legacy data backups are generated in the legacy backup environment by a legacy file level backup application;
   receiving application specific information regarding the legacy data backups eligible for migration, wherein the application specific information is received from a legacy backup client program of the legacy backup environment in response to a query sent to the legacy backup client program, and wherein the application specific information comprises application specific commands and application specific interfaces;
   filtering the application specific information to indicate only legacy backup data that must be migrated representing a type of migration desired;
   presenting the application specific information corresponding to the legacy backup data that must be migrated as a virtual filesystem mounted within an operating system such that the application specific information is seen as live local data; and
   migrating the backup data indicated by the filtering to a new backup environment by performing a file level backup of the virtual filesystem mounted within the operating system, wherein the backup reads files in the backup data indicated by the filtering from the virtual filesystem and stores read files in the backup data in the new backup environment, wherein the file level backup comprises passing an individual data file directly from the legacy backup client program to a read process of a new backup client program in the new backup environment consuming no disk storage at all.

2. The method of claim 1 further comprising:
   mapping the application specific information regarding the legacy data backups into a common data format prior to the filtering of the application specific information to represent the type of migration desired.

3. The method of claim 1 further comprising:
   querying the legacy backup environment to determine a data retention period for the legacy data backups eligible for migration.

4. The method of claim 1 further comprising:
   determining whether a read request was received for the individual data file on the virtual filesystem;
   responsive to determining that the read request was received for the individual data file on the virtual filesystem, pulling information corresponding to the individual data file from the virtual filesystem; and
   retrieving the individual data file from the legacy backup environment based on the information corresponding to the individual data file pulled from the virtual filesystem.

5. The method of claim 4 further comprising:
   writing the individual data file to a new backup environment from the read process of the new backup client program.

6. The method of claim 5 further comprising:
   setting a retention period for the individual data file in the new backup environment equal to a remaining retention period of the individual data file in the legacy backup environment.

7. The method of claim 1, wherein the virtual filesystem is mounted within the operating system as read only, and wherein the operating system is similar to an operating system of legacy backup environment.

8. The method of claim 1, wherein the virtual filesystem represents one historical data backup.

9. The method of claim 1, wherein the legacy data backups are filtered based on regulatory rules.

10. A computer system comprising:
    a bus system;
    a storage device connected to the bus system, wherein the storage device stores program instructions; and
    a processor connected to the bus system, wherein the processor executes the program instructions to:
    identify legacy data backups eligible for migration in a legacy backup environment, wherein the legacy data backups are generated in the legacy backup environment by a legacy file level backup application;
    receive application specific information regarding the legacy data backups eligible for migration, wherein the application specific information is received from a legacy backup client program of the legacy backup environment in response to a query sent to the legacy backup client program, and wherein the application specific information comprises application specific commands and application specific interfaces;
    filter the application specific information to indicate only legacy backup data that must be migrated representing a type of migration desired;
    present the application specific information corresponding to the legacy backup data that must be migrated as a virtual filesystem mounted within an operating system such that the application specific information is seen as live local data; and
    migrate the backup data indicated by the filtering to a new backup environment by performing a file level backup of the virtual filesystem mounted within the operating system, wherein the backup reads files in the backup data indicated by the filtering from the virtual filesystem and stores read files in the backup data in the new backup environment, wherein the file level backup comprises passing an individual data file directly from the legacy backup client program to a read process of a new backup client program in the new backup environment consuming no disk storage at all.

11. A computer program product comprising a computer readable storage medium having program instructions embodied therewith, the program instructions executable by a computer to cause the computer to perform a method comprising:

identifying legacy data backups eligible for migration in a legacy backup environment, wherein the legacy data backups are generated in the legacy backup environment by a legacy file level backup application;

receiving application specific information regarding the legacy data backups eligible for migration, wherein the application specific information is received from a legacy backup client program of the legacy backup environment in response to a query sent to the legacy backup client program, and wherein the application specific information comprises application specific commands and application specific interfaces;

filtering the application specific information to indicate only legacy backup data that must be migrated representing a type of migration desired;

presenting the application specific information corresponding to the legacy backup data that must be migrated as a virtual filesystem mounted within an operating system such that the application specific information is seen as live local data; and migrating the backup data indicated by the filtering to a new backup environment by performing a backup of the virtual filesystem mounted within the operating system, wherein the backup reads files in the backup data indicated by the filtering from the virtual filesystem and stores read files in the backup data in the new backup environment, wherein the file level backup comprises passing an individual data file directly from the legacy backup client program to a read process of a new backup client program in the new backup environment consuming no disk storage at all.

12. The computer program product of claim 11 further comprising:

mapping the application specific information regarding the legacy data backups into a common data format prior to the filtering of the application specific information to represent the type of migration desired.

13. The computer program product of claim 11 further comprising:

querying the legacy backup environment to determine a data retention period for the legacy data backups eligible for migration.

14. The computer program product of claim 11 further comprising:

determining whether a read request was received for the individual data file on the virtual filesystem;

responsive to determining that the read request was received for the individual data file on the virtual filesystem, pulling information corresponding to the individual data file from the virtual filesystem; and retrieving the individual data file from the legacy backup environment based on the information corresponding to the individual data file pulled from the virtual filesystem.

15. The computer program product of claim 14 further comprising:

writing the individual data file to a new backup environment from the read process of the new backup client program.

16. The computer program product of claim 15 further comprising:

setting a retention period for the individual data file in the new backup environment equal to a remaining retention period of the individual data file in the legacy backup environment.

17. The method of claim 1 wherein the legacy backup environment and the new backup environment are operable on the same data processing system.

18. The computer program product of claim 11 wherein the legacy backup environment and the new backup environment are operable on the same data processing system.

19. The computer program product of claim 11, wherein the virtual filesystem is mounted within the operating system as read only, and wherein the operating system is similar to an operating system of legacy backup environment.

20. The computer program product of claim 11, wherein the virtual filesystem represents one historical data backup.

* * * * *